2,776,291
METHOD OF STABILIZING LAURYL PYRIDINIUM HYDROCHLORIDE

Frank X. Russo, Bronx, N. Y., assignor to Vitogen Products, Inc., New York, N. Y., a corporation of New York No Drawing. Application October 25, 1954, Serial No. 464,197

8 Claims. (Cl. 260—290)

This invention relates to a purified and stabilized compound, lauryl pyridinium chloride and a method of preparing it. More particularly, it relates to a method of preparation of technical grade lauryl pyridinium chloride containing about 10 to 11% of impurities including lauryl alcohol, pyridinium chloride and lauryl alcohol as well as other materials which may have been used in its manufacture on a technical scale, in which these impurities are removed without disruption of the excellent germicidal qualities of the compound.

It is another object of this invention to provide a method of purifying the germicide, lauryl pyridinium chloride, to make it more stable with respect to temperature changes, changes of pH, and changes occurring when it is in contact with organic matter and hard water salts.

It is a further object of this invention to provide a method of producing stabilized purified lauryl pyridinium chloride in which the germicidal qualities of the compound are substantially retained.

It is still another object of this invention to provide a process for producing pure lauryl pyridinium chloride by digesting the impure compound with a protein so that the unprecipitated liquor will be without appreciable odor.

Other and further objects of this invention will become more apparent upon consideration of the following description.

Prior to this invention, lauryl pyridinium chloride had been used commercially as a textile lubricant and as a wetting agent for certain types of fibers. Its high germicidal potency had not been utilized because it is available commercially only in an impure technical grade, which contains 10% to 11% impurities. Some of these impurities are lorol, fatty acid, lauryl chloride and pyridine hydrochloride. These impurities rendered the compound bacteriologically unstable and, therefore, undesirable commercially as a quaternary ammonium compound having a high and stable germicidal value.

Although attempts have been made to produce a purified lauryl pyridinium chloride, these have not, to my knowledge, been commercially practiced. My investigations have shown that reaction of crude lauryl pyridinium chloride with any high molecular weight water-soluble protein, preferably of a molecular weight in the range 120,000–150,000, under proper conditions yields a purified, stabilized lauryl pyridinium chloride with a minimum of diminution of the compound's beneficial germicidal properties. The water-soluble proteins may contain up to 18 different amino acids, and the molecular weight of a protein may vary from 30,000 to 200,000 or more. I have found that using proteins containing more than 14 of the amino acids or having a molecular weight greater than 150,000 may be satisfactorily used in my process. Those amino acids specifically found acceptable and used in my experimentation were: glycine, alanine, valine, leucine, isoleucine, proline, phenyalanine, troysine, aspartic acid, glutamic acid, oxyglutamic acid, serine, hydroxypyroline and methionine. Sources of high molecular weight water-soluble protein are: soy bean protein, blood protein, chick pea protein, egg albumin, etc.

It is well known that quaternary amino compounds are cationic. Their bacteriological potency is inactivated on contact with protein or other organic matter, metallic salts or acids and pH changes. One of the major factors for such incompatibility is the fact that many of these quaternary compounds contain methyl groups attached to the nitrogen atom. Lauryl pyridinium chloride contains no such methyl groups, is of high molecular weight and consequently is less affected than N-methyl quaternary compounds by water-soluble proteins.

To better understand the importance of my invention, the characteristics of technical grade lauryl pyridinium chloride and that compound after purification by my process are listed hereafter:

Lauryl pyridinium chloride (technical grade)

Average formula: $C_5H_5N(C_{12.6}H_{26.2})Cl$

| | |
|---|---|
| Molecular weight | 292.0 |
| Impurities | 10% to 11% |
| Melting point | 45° C. |
| Specific gravity | 0.99 at 25° C. |
| Flash point | 165° C. |
| Fire point | 175° C. |

The technical grade is a brown, mottled semi-solid, soapy to the touch, emitting the odor of pyridine.

Solubility at 25° C.:

| | |
|---|---|
| Acetone | very sol. |
| Benzene | sol. |
| Butyl propionate | sol. |
| Carbon tetrachloride | sol. |
| Diethyl ether (turbid) | very sol. |
| Water (very turbid) | 25 g. per 100 g. water |

Surface tension at 29° C.:

| | |
|---|---|
| 0.1% solution | 45 dynes per centimeter |
| .05% solution | 35 dynes per centimeter |

Lauryl pyridinium chloride (refined grade)

Formula: $C_5H_5N(C_{12}H_{26})Cl$

| | |
|---|---|
| Molecular weight | 284.5 |
| Impurities | 1% (approx.) |
| Boiling point | 160° C. |
| Specific gravity | 0.982 at 25° C. |

The refined grade of lauryl pyridinium chloride obtained by means of my inventive method is an odorless, clear solution, amber in color.

Solubility at 25° C.:

| | |
|---|---|
| Acetone | sol. |
| Ethyl alcohol | sol. |
| Isopropyl alcohol | sol. |
| Diethyl ether (turbid) | sol. |
| Diols | sol. |
| Benzene | mish. |
| Fatty oils | mish. |
| Vaseline | mish. |
| Mineral oil | mish. |
| Terpines | mish. |

Soluble in water in any proportion. A 2% solution has a neutral pH.

Compatible with:
  Non-ionic detergents, pH not above 9
  Amphoteric protein complexed detergents 50–50, pH not above 7.5
  Sodium bicarbonate Sodium carbonate
Boric acid (cloudy)
Trisodium phosphate 2%
Sodium tripoly phosphate 10%
Sodium nitrate 2%
Sodium metasilicate 2%
Sodium sesquisilicate 2%
Urea carbamide, any proportion
Phosphoric acid 50% sol. 1%
Basic dyes Incompatible with:

Anionic soaps and synthetic detergents
Anionic wetting agents
Sodium hexametaphosphate
Sodium tetraphosphate
Potassium dichromate
Pluronic detergents
Anionic dyes An examination of the physical and chemical characteristics of lauryl pyridinium chloride (technical grade) now in commercial use and the refined grade produced by my invention reveals the above marked difference between the two products; this differentiation is even apparent upon casual examination, for the technical grade is a semi-solid while the refined grade is a liquid, but as previously mentioned, one of the major advantages of the refined grade is its bacteriological stability, a quality not possessed by impure lauryl pyridinium chloride.

Disinfectants are effective because of their cationic activity and must be in water solution in order to be able to kill bacteria, since no such thing as a dry disinfectant exists. One can sprinkle a disinfectant in the form of a powder over dry bacteria with no effect. As soon as water is added to the dry disinfectant, germicidal activity ensues and functions to destroy the bacteria. The standard unit comprising one phenol coefficient is a solution of one part phenol diluted in 60 parts of water at 20° C. It is the phenol coefficient of the compound that must not be substantially diminished during the process of purifying crude lauryl pyridinium chloride to the refined product. In my invention, the phenol coefficient of the lauryl pyridinium chloride is not appreciably lessened by my refining process.

Solutions of lauryl pyridinium chloride treated by the process of my invention in a solvent comprising 50% isopropyl alcohol and 50% water—hereafter designated as tinctures—and in a solvent of water alone were tested for their germicidal potency. As compared with phenol in activity against Staphylococcus Aureus 209, according to the tests described in Circular 198 of the U. S. Department of Agriculture, "Methods of Testing Antiseptics and Disinfectants," the following results were obtained:

| Solution: | Phenol coefficient |
|---|---|
| 5% tinc. | 10.0 |
| 10% tinc. | 11.6 |
| 15% tinc. | 33.3 |
| 33.3% tinc. | 58.3 |
| 33.3% aqueous | 83.3 |

Using the same tests prescribed in the Department of Agriculture circular, the following results were obtained in measuring potency against Eberthella typhosa:

| Solution: | Phenol coefficient |
|---|---|
| 5% tinc. | 6.3 |
| 10% tinc. | 7.5 |
| 15% tinc. | 18.8 |
| 33.3% tinc. | 37.5 |
| 33.3% aqueous | 32.5 |

Tests were also made of the germicidal effect of an 18% tincture of my refined lauryl pyridinium chloride on infected human skin, using E. coli microorganism, one million count per cubic centimeter. After 15 minutes contact with a series of subjects, the tincture of refined lauryl pyridinium chloride had acted so that only 7% to 40% of the bacteria retained their ability to reproduce.

The effect of the length of time in which a solution of my refined lauryl pyridinium chloride is allowed to remain in contact with an infected area on the bacteria count is shown graphically below:

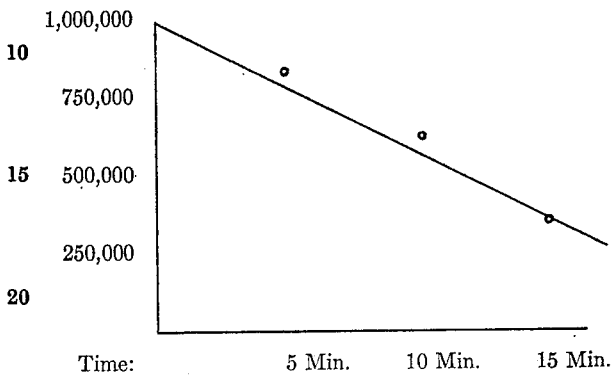

The area was initially infected with E. coli microorganism, one million count per cubic centimeter, and ⅓ cc. of 18% tincture of my refined lauryl pyridinium chloride applied to the area.

In addition to the tests described above, the Thioglycolate test, promulgated by the U. S. Department of Agriculture, was applied to an 18% tincture of my refined lauryl pyridinimum chloride. The response was positive.

Having described the properties of lauryl pyridinium chloride, I shall now provide some specific examples to illustrate methods of preparation which I have invented:

EXAMPLE 1

One thousand parts of 25% solution of lauryl pyridinium chloride is placed in a stainless steel tank of larger capacity, equipped with a center standard flat propeller agitator, with a speed of no more than 60 R. P. M. This solution is continually agitated, beginning the process of digestion. While the above solution is being agitated, 25 parts of a 30% water solution of plasma or blood proteins are sprayed upon the surface of the agitated solution of lauryl pyridinium chloride, which begins to react violently within two minutes by digesting the protein solution, transforming it into heavy lumps and precipitating the lumps at the bottom of the tank. The liquid is milky in appearance.

At intervals of ten minutes additional 25 parts of protein solutions are sprayed into the lauryl pyridinium chloride solution. Each period of spraying is continued as long as the reaction continues, and until the solution has digested from 200 to 300 parts of the protein solution, depending on the action of impurities involved. This process is continued until the end of the digesting reaction, when the compound clears and the addition of more protein solution causes a precipitate at the bottom of the tank causing no further reaction or cloudiness. This is an indication that the cationic solution of lauryl pyridinium chloride will not digest more than 20% to 30% of protein solution, and therefore the loss of cationic value of the lauryl pyridinium chloride is equal to the percentage of protein solution digested with a resulting volume of finished product approximately 1.100 parts.

The reaction and digestion process is complete, as evidenced by the fact that the orginal solution is clear and stable, when separated from the precipitated residual impurities. The mixing is terminated and the product is allowed to settle for 48 hours to allow a complete splitting of impurities and liberation of protein residues, which, being heavier and in the form of a paste, precipitate at the bottom of the tank, and the clear solution or finished product is decanted by means of pumps. When analyzed, it has the following characteristics:

1. Crystal clear liquid (amber color)
2. Solubility in water complete in any proportion
3. Isoelectric point neutral
4. Non volatile
5. Non corrosive, non irritant

EXAMPLE II

One thousand parts of a 25% solution of lauryl pyridinium chloride are again placed in a stainless steel tank and agitated. This time 25 parts of a 30% water solution of soy bean proteins is sprayed at the surface of the agitated solution of lauryl pyridinium chloride. Again a violent reaction follows with a precipitate appearing at the bottom of the tank. For each subsequent 10 minutes, 25 parts of soy bean protein solution are sprayed into the lauryl pyridinium chloride solution. After further adding of the water-soluble protein the condition is reached when the milky appearance of the crude lauryl pyridinium chloride solution disappears and the solution becomes clear so that the protein causes no further reaction. The mixing is then terminated and the product allowed to settle for 48 hours. The clear solution above the precipitate is decanted and when analyzed, has the following characteristics:

1. Crystal clear liquid (amber color)
2. Solubility in water complete in any proportion
3. Isoelectric point neutral
4. Non volatile
5. Non corrosive, non irritant The above described embodiments of this invention are for the purpose of illustration only and it is intended that this invention be limited only by the scope of the appended claims.

This application is a continuation-in-part of my pending application, Serial Number 287,627, filed May 13, 1952.

I claim:

1. A method of purifying and clarifying a cloudy aqueous solution of crude lauryl pyridinium chloride containing lauryl alcohol, lauryl chloride and pyridinium chloride impurities, which when dissolved in water provides a turbid solution comprising dissolving said crude lauryl-pyridinium chloride in water, treating the water solution of said crude pyridinium chloride under agitation with a water-soluble protein in an amount sufficient to remove the turbidity, said protein being added to the surface of said solution to form a precipitate in the form of lumps which settle to the bottom and which remove the cloudiness in said crude solution, the amount of said protein being added being such as will remove the impurities causing said cloudiness to the bottom, and separating the clarified water solution of lauryl pyridinium chloride from the precipitated protein.

2. A method of purifying and clarifying crude lauryl pyridinium chloride as claimed in claim 1 wherein said water soluble protein is dissolved in water and added in the form of an aqueous solution to said solution of crude lauryl pyridinium chloride.

3. A method of purifying and clarifying crude lauryl pyridinium chloride as claimed in claim 2 wherein said water soluble protein is blood protein.

4. A method of purifying and clarifying crude lauryl pyridinium chloride as claimed in claim 2 wherein said water soluble protein is soya bean protein.

5. A method of purifying and clarifying crude lauryl pyridinium chloride as claimed in claim 2 wherein said water soluble protein is egg protein.

6. A method of purifying and clarifying crude lauryl pyridinium chloride as claimed in claim 2 wherein said water soluble protein is chick pea protein.

7. A method of purifying and clarifying crude lauryl pyridinium chloride as claimed in claim 2 wherein said water soluble protein is sprayed in portions over the top of the solution of crude lauryl pyridinium chloride, while under agitation, each portion reacting with the solution containing the crude lauryl pyridinium chloride and settling before the next portion is added and until the crude portion is clarified.

8. A method of purifying and clarifying crude lauryl pyridinium chloride as claimed in claim 7 wherein said water soluble protein is a 30% solution of protein in water and said crude lauryl pyridinium chloride containing about 10–11% impurities is dissolved in water to make a 25% solution thereof.

References Cited in the file of this patent

UNITED STATES PATENTS 2,502,643     Dirnberger               Apr. 4, 1950

OTHER REFERENCES

Tice et al.: Chem. Abst., vol. 41, col. 7667 (1947).
Anson et al.: "Advances in Protein Chem.," vol. IV, pp. 80–87 (1948).
Jerchel et al.: Chem. Abst., vol. 48, col. 5894 (1954), citing Z. Naturforsch, 8B, pp. 541–7 (1953).